United States Patent [19]
Jackson et al.

[11] Patent Number: 6,163,580
[45] Date of Patent: Dec. 19, 2000

[54] METHOD AND APPARATUS FOR DATA DETECTION WITH AN ENHANCED ADAPTIVE THRESHOLD

[75] Inventors: H. Spence Jackson; Mathew A. Rybicki; Shahriar Rokhsaz, all of Austin, Tex.

[73] Assignee: Sigmatel, Inc., Austin, Tex.

[21] Appl. No.: 08/871,194

[22] Filed: Jun. 9, 1997

[51] Int. Cl.[7] .............................. H04L 25/10; H03D 1/00
[52] U.S. Cl. ............................................. 375/317; 375/340
[58] Field of Search ...................................... 375/317, 340, 375/346, 348, 239; 327/306, 315, 318, 319; 330/207 A, 10.251

[56] References Cited

U.S. PATENT DOCUMENTS

| | | | |
|---|---|---|---|
| 4,142,116 | 2/1979 | Hardy, Jr. et al. | 307/350 |
| 5,561,469 | 10/1996 | Schultz | 348/476 |
| 5,933,040 | 8/1999 | Rokhsaz et al. | 327/306 |

*Primary Examiner*—William Luther
*Attorney, Agent, or Firm*—Timothy W. Markison

[57] ABSTRACT

A method and apparatus for detecting data is accomplished by an enhanced adaptive threshold which is coupled to receive a data signal and a first reference value. The enhanced adaptive threshold, based on the inputs, provides a threshold to a mixing circuit which, in turn, mixes the threshold with the data signal. The output of the mixer is then subsequently compared with a reference signal to provide an indication of the data signal and preserving its pulse width. The threshold produced by the adaptive threshold circuit is a fixed value when the relationship between the data signal and the first value is in the first state (i.e., the data signal is less than the first value) and the threshold is a proportional threshold when the data signal and the first value are in a second relationship (i.e., the data signal is greater than the first value).

16 Claims, 5 Drawing Sheets

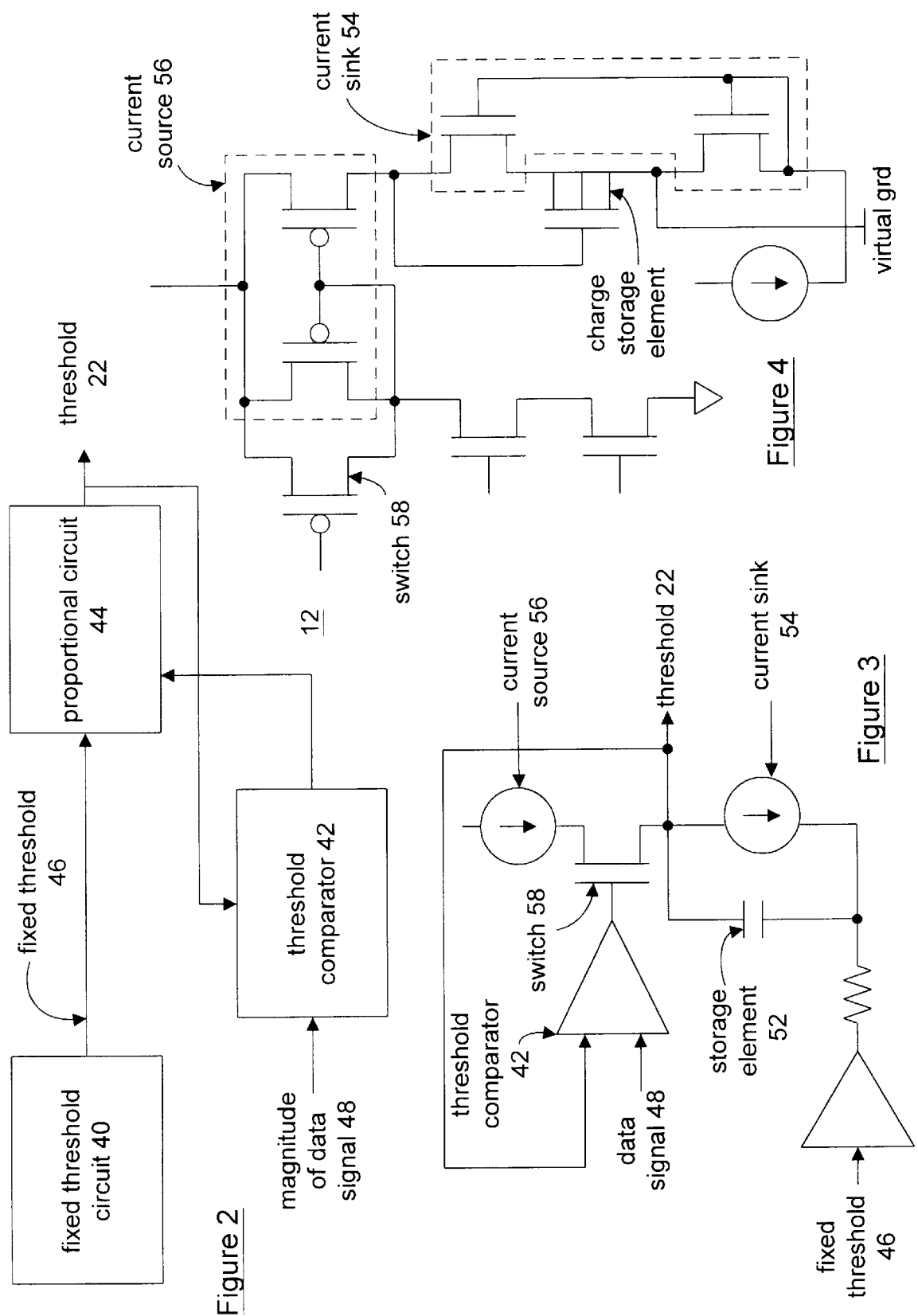

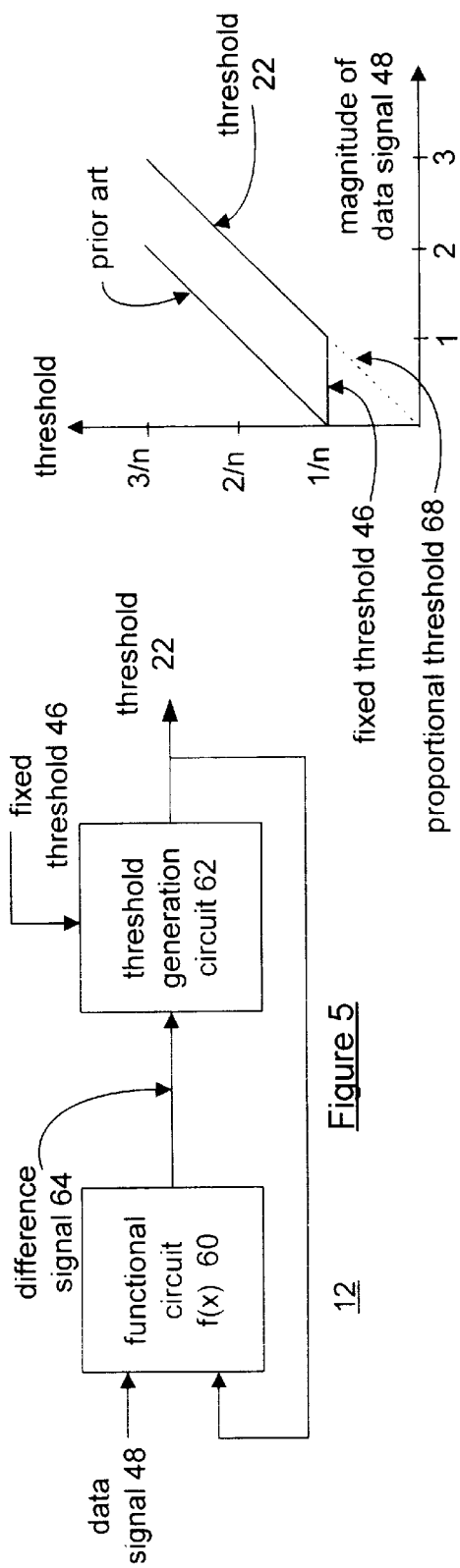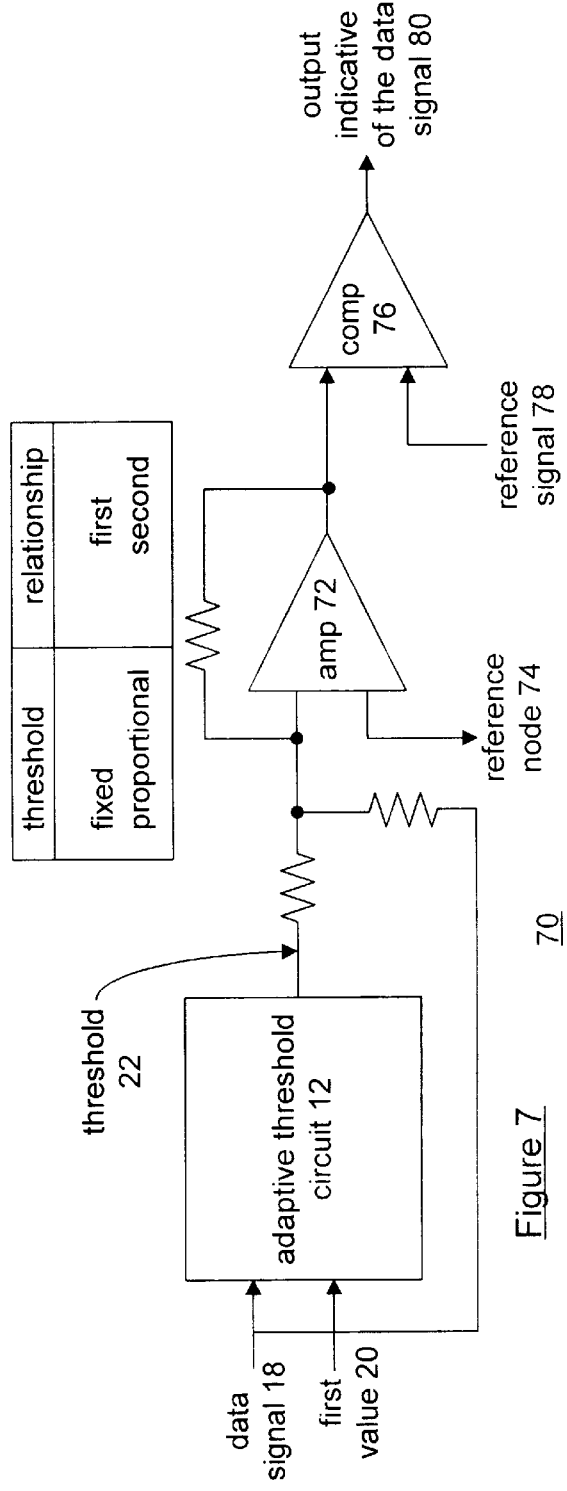

METHOD AND APPARATUS FOR DATA DETECTION WITH AN ENHANCED ADAPTIVE THRESHOLD

TECHNICAL FIELD OF THE INVENTION

This invention relates generally to data receivers and more particularly to a method and apparatus for detecting pulse data.

BACKGROUND OF THE INVENTION

Transmission of digital data is well-known in the art. Such transmission may occur over wire-lined transmission paths or wireless transmission paths. Such wireless transmission paths include radio frequency and optical, such as infrared (IR). For IR transmissions, a light transmitting diode is pulsed on and off to generate a light pulse, which is subsequently received by a light receiving diode. Such wireless IR communication requires that the receiving transmission diode be in the line of sight with the transmitting diode.

A wide variety of circuits utilize infrared transmission paths to communicate data from one device to another. For example, remote controls for televisions, radios, amplifiers, etc. use IR transmission paths to transmit data from the remote controller to the particular device. Current infrared technology developments have enabled computers to utilize infrared transmission paths. For example, an IR communication path may be established between a computer's central processing unit (CPU) and a printer. One such means of utilizing an IR path is based on an IrDA transmission standard of 4 PPM (four pulse position modulation).

4 PPM incorporates 500 nSec time slots, or chips, to obtain a four megabits per second data rate. Each of the 500 nSec times slots are divided into four equal time sections; where a data pulse may resided in any one of the four sections. If the pulse reside in the first section of a time slot, the data pulse represents a binary value of 00, if the pulse resides in the second section of the time slot, the data pulse represents a binary value of 01; if the pulse resides in the third section, the data pulse represents a binary value of 10, and if the pulse resides in the fourth section, the data pulse represents a binary value of 11. To accurately detect each of these four pulse positions, it is essential that the receiver's pulse width be preserved to prevent a pulse in one quadrant of a time slot from overlapping an adjacent quadrant.

A difficulty arises with infrared transmission due to the wide dynamic range (Eg. 100,000:1) of the infrared signal being transmitted. For example, if the transmitting diode and receiving diode are in close proximity (less than 0.01 meters), the current through the receiving diode may be as much as, or larger than 10 mAmps. If, however, the transmitting diode and receiving diode are a substantial distance apart (greater than 1 meters), the current through the receiving diode may be as small as, or smaller than, a 100 nAmps. Since pulse width control is essential to receiving 4 PPM accurately, then the pulse width must be preserved over the entire range.

When the current through the receiving diode is approximately 100 nAamps it can be difficult to detect when a pulse exists and in which section of a time slot it resides if the received pulse is not well controlled. Typically, to detect the presence of a pulse, a comparison circuit is used to compare an incoming data signal, which has been amplified, to a predetermined threshold. As apparent, when the magnitude of the incoming data signal is large, it is easy to detect. Conversely, when the magnitude of the incoming data signal is small, the ability to detect its presence becomes difficult, resulting in valid pulses not being detected.

One solution to more accurately detect widely varying magnitude data signals (Eg. 100 nAmp–10 mAmp data signals created by a light receiving diode) is to employ an adaptive threshold circuit. The adaptive threshold circuit generates an adapted threshold, which is a fixed threshold plus a representation of the magnitude of the data signal. As such, the adaptive threshold is based on the magnitude of the data signal, in particular, the threshold (TH)=fixed threshold +m*(magnitude of the data signal), where m is the slope, which may be 1/n, n being an integer. A difficulty arises with the adaptive threshold circuit, in that, when the magnitude of the data signal is widely varying, it may go undetected because of the representation portion of the adaptive threshold. When pulses are undetected, the transmitted data is corrupted and unusable.

Therefore, a need exists for a method and apparatus that provides an enhanced adaptive threshold circuit that allows for widely varying data signals to be accurately detected.

BRIEF DESCRIPTION OF THE DRAWINGS

FIG. 2 illustrates a schematic block diagram of the adaptive threshold circuit of FIG. 1;

FIG. 3 illustrates a schematic diagram of the proportional circuit of FIG. 2;

FIG. 4 illustrates an alternate schematic diagram of the proportional circuit of FIG. 2;

FIG. 5 illustrates a schematic block diagram of an alternate adaptive threshold circuit of FIG. 1;

FIG. 6 illustrates a graphical representation of a threshold produced in accordance with the present invention;

FIG. 7 illustrates a schematic block diagram of an alternate data detection circuit which is in accordance with the present invention;

DETAILED DESCRIPTION OF THE DRAWINGS

Generally, the present invention provides a method and apparatus for detecting data. This is generally accomplished by including an enhanced adaptive threshold which is coupled to receive a data signal and a first reference value. The enhanced adaptive threshold, based on the inputs, provides a threshold to a mixing circuit which, in turn, mixes the threshold with the data signal. The output of the mixer is then subsequently compared with a reference signal to provide an indication of the data signal. The threshold produced by the adaptive threshold circuit is a fixed value when the relationship between the data signal and the first value is in the first state (i.e., the data signal is less than the first value) and the threshold is a proportional threshold when the data signal and the first value are in a second relationship (i.e., the data signal is greater than the first value). By incorporating an enhanced adaptive threshold circuit in a data detection circuit, the difficulties of detecting the presence of widely varying magnitude data signals are substantially overcome.

Figure 1:
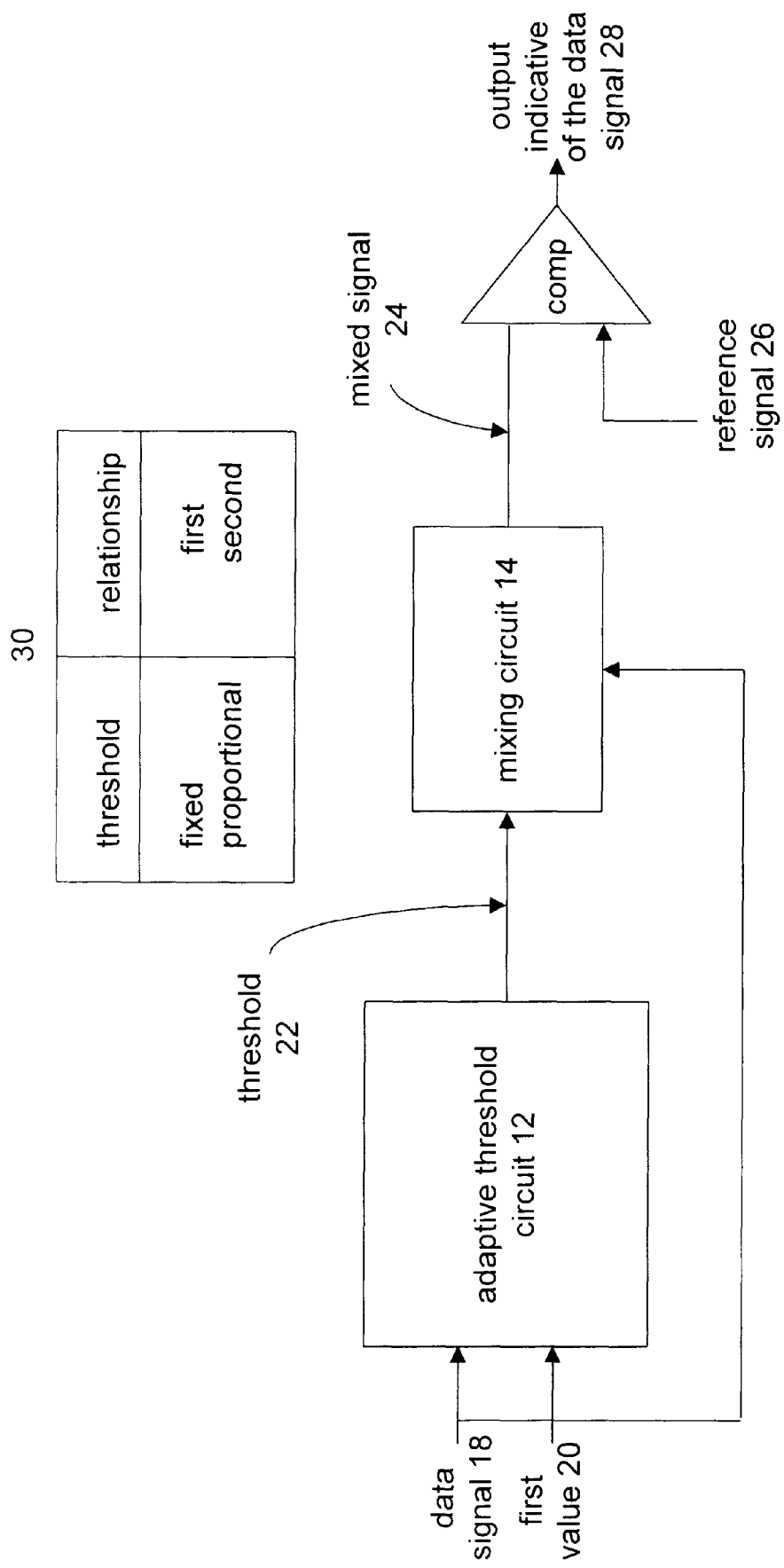
FIG. 1 illustrates a schematic block diagram of a data detection circuit which is in accordance with the present invention.

The present invention can be more fully described with reference to FIGS. 1 through 9. FIG. 1 illustrates a data detection circuit 10 that includes an enhanced adaptive threshold circuit 12, a mixing circuit 14, and a comparator 16. The enhanced adaptive threshold circuit 12 receives, as inputs, a digital signal 18 and a first value 20. The enhanced adaptive threshold circuit 12 provides a threshold 22 based on the relationship between the data signal 18 and the first value 20. Note that the first value 20 is set to a value that is slightly less than the minimum magnitude of the data signal (Eg. the first value may be set to a value of approximately 40 mVolts when the minimum data signal is a 100 nAmp signal produced by a light receiving diode which is subsequently amplified to a voltage signal having a magnitude of approximately 80 mVolts).

The resulting threshold 22 has two different states as illustrated in Table 30. The first state occurs when the data signal 18 and first value 20 have a first relationship, which may occur when the data signal 18 is less than the first value 20. In the first state, the threshold 22 is equal to a fixed threshold. The second state occurs when the data signal 18 and first value 20 are in a second relationship, which may occur when the data signal 18 is greater than the first value 20. In the second state, the threshold 22 is a proportional threshold, which may be a proportional representation of the magnitude of the data signal. By providing a fixed value threshold, the difficulties of the prior art by constantly adding an adaptive threshold to a fixed threshold has been removed.

The mixing circuit 14 receives as inputs receives the threshold 22 and the data signal 18 as inputs. This mixing circuit combines the two inputs to produce a mixed circuit signal 24 which is inputted to the comparator 16. The comparator 16 compares the mixed signal 24 with a reference signal to provide an output that is indicative of the data signal 28 while preserving the pulse width of the data signal 18. The output being indicative of the data signal 28 may be used to indicate whether there is data present, and the type of the data that is present. In other words, the output indicative of the data signal 28 is a representation of the data signal when data is present and provides a low output when there is no data signal.

FIG. 2 illustrates a schematic block diagram of the enhanced adaptive threshold circuit 12 of FIG. 1. As shown, the enhanced adaptive threshold circuit 12 includes a fixed threshold circuit 40, a threshold comparator 42, and a proportional circuit 44. The fixed threshold circuit 40, which may be a voltage reference circuit, produces a fixed threshold 46 and provides it to the proportional circuit 44. The threshold comparator circuit 42 compares the threshold 22 and the magnitude of the data signal 48. When the magnitude of the data signal 48 is greater than the threshold 22, the comparator 42 provides a first signal and, when the magnitude of the data signal 48 is less than the threshold 22, the comparator provides a second signal. The first signal causes the proportional circuit 44 to increase the threshold 22 by a proportional representation of the data signal 48. The second signal causes the proportional circuit 44 to stop increasing the threshold 22 by the proportional representation of the data signal 48. When this occurs, the threshold 22 may remain at the current value or decrease at a rate much less that the proportional representation of the data signal 48. Note that the threshold 22 will not decrease to a value below the fixed threshold 46.

FIG. 3 illustrates a schematic diagram of the proportional circuit 44. As shown, the proportional circuit 44 includes a buffer 50, a storage element 52, a current sink 54, and a current source 56, and a switch 58. The schematic diagram also includes the threshold comparator 42. In operation, when the data signal 48 is below the threshold 22, the threshold comparator 42 provides the second signal which keeps switch 58 off. In this condition, current source 56 is decoupled from the storage element 52, which may be a capacitor, and, as such, is not providing current to the storage element 52. When the current source is decoupled from the storage element 52, current sink 54 sinks current from storage element 52 at value which is much less than the current source value [in the order of $\frac{1}{10}$ th to $\frac{1}{100}$ th of the current source value]. Note that if the storage element 52 is completely discharged, the threshold 22 will be the fixed threshold 46.

When the data signal 48 begins to exceed the threshold 22, the threshold comparator 42 provides the second signal which activates switch 58. With switch 58 active, the current source 56 provides current to the storage element 52. As this occurs, the voltage across the storage element 52 is increasing, thus raising the threshold 22. As the threshold 22 raises, it will eventually exceed the magnitude of the data signal 18. At this point, the threshold comparator 42 produces the first signal which shuts off switch 58. In this state, current sink 54 is sinking current from the storage element 52, which causes the threshold 22 to drop. When the threshold 22 drops below the magnitude of the data signal 48, but not below the fixed threshold 46, the comparator 42 again provides the first signal which turns on switch 58. Switch 58 will be continually turned on and off in this manner as the magnitude of the data signal 48 changes.

FIG. 4 illustrates a more detailed schematic representation of the proportional circuit 44. As shown, the current sources 56 and 54 are comprised of a pair of transistors. The switch 58 is shown to be coupled in parallel with the current source 56. As switch 58 is enabled, it begins to short-out the transistor of the current source 56 thus disabling, or decoupling, the current source 56 from the storage element 52. The storage element 52 may be the gate capacitance of a MOSFET transistor.

FIG. 5 illustrates a schematic block diagram of an alternate embodiment for the enhanced adaptive threshold circuit 12. As shown, the enhanced adaptive threshold circuit 12 includes a functional circuit 60 and a threshold generation circuit 62. The functional circuit 60 receives the data signal 48 and the threshold signal 22 as inputs. The functional circuit performs a particular mathematical function f(x), which may be (I)=cdv/dt or dv=I*(dt)/c, on the data signal 48 and the threshold 22 to produce a difference signal 64. The difference signal 64 is in a first state when the threshold 22 is greater than the magnitude of the data signal 48 and in a second state when the magnitude of the data signal 48 is greater than the threshold 22. When in the first state, the difference signal 64 causes the threshold generator 62 to output the fixed threshold 46 as the threshold 22. When in the second state, the difference signal 64 causes the threshold generator 62 to output a proportional threshold as the threshold 22, where the proportional threshold is a representative portion of the magnitude of the data signal 48.

FIG. 6 illustrates a graphical representation of the threshold of 22 which includes fixed threshold component 46 and a proportional threshold component 68. As shown, the fixed threshold component 46 is a constant value independent of the magnitude of the data signal 48 while the proportional threshold component 68 is a first order signal that is based on the magnitude of the data signal. The threshold 22 equals the fixed threshold 46 when the magnitude of the data signal is less than the fixed threshold 46 and equals the magnitude of the data signal 48 when the magnitude of the data signal is greater than the threshold 22, as described above. By utilizing such a threshold, the data detection circuit of FIG. 1, or of FIG. 7 provides greater pulse width control in the presence of widely varying magnitude data signals, which allows for more accurate reception of the data signals 48. For the purposes of this discussion, a widely varying magnitude data signal is one that has been generated by an infrared transmission wherein the receiving diode produces a 100 nAmps to 10 mAmps current data signal.

FIG. 7 illustrates a schematic block diagram of an alternate data detection circuit 70. The data detection circuit 70 includes an enhanced adaptive threshold circuit 12, an amplifier 72, and a comparator 76. In operation, the enhanced adaptive threshold circuit 12 receives the data signal 18 and a first value 20 as inputs to produce the threshold 22. (Note that the first value 20 may be the fixed threshold.) The resulting threshold 22 is mixed with the data signal 18 through a pair of resistors at an input node of the amplifier 72. The other input of the amplifier is coupled to a reference node 74, while the output of the amplifier 72 is coupled to an input of the comparator 76. The comparator 76 compares the output of amplifier 72 with a reference signal 78 to produce an output that is indicative to the data signal 80 with a similar pulse width. As one skilled in the art will readily appreciate, the reference signal 78 and reference node 74 may be set at any potential between the supply rails, but are typically set to a nominal potential mid way between the rails.

Figure 8:
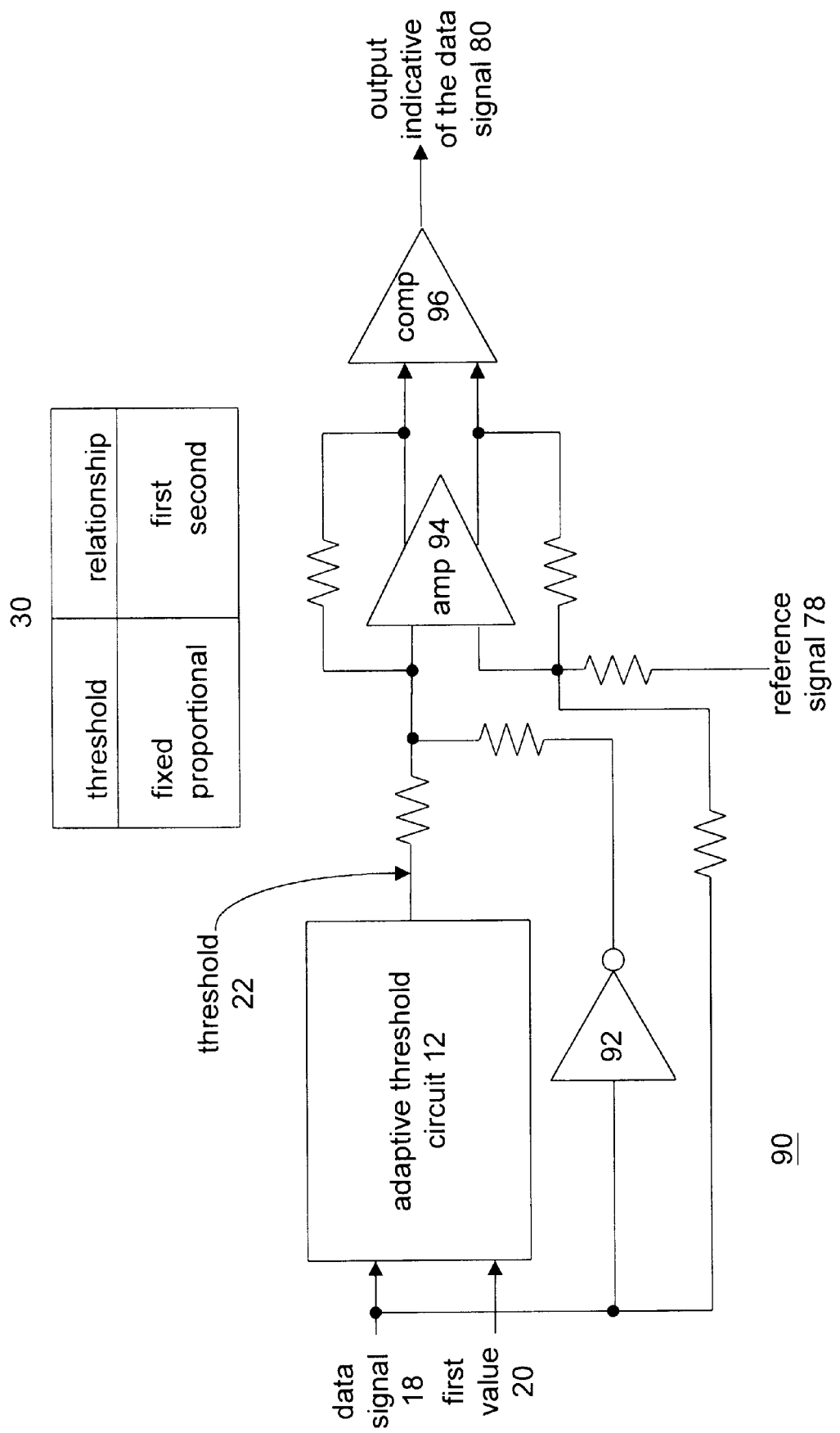
FIG. 8 illustrates a schematic block diagram of another alternate data detection circuit which is in accordance with the present invention.

FIG. 8 illustrates a schematic block diagram of yet another embodiment for a data detection circuit 90. The data detection circuit 90 includes the enhanced adaptive threshold circuit 12, a differential amplifier 94, and a differential comparator 96. As shown, the enhanced adaptive threshold circuit 12 receives the data signal 18 and the first value 20 as inputs and produces therefrom the threshold 22. The amplifier 94 receives, at a first input, a mixed signal of the threshold 22 and an inversion of the data signal through inverter 92. The second input of the differential amplifier 94 receives a mixed signal of the data signal 18 and a reference signal 78. The differential outputs of the amplifier 94 are provided to the comparator 96 which subsequently produces an output indicative of the data signal 80 while preserving its pulse width.

Figure 9:
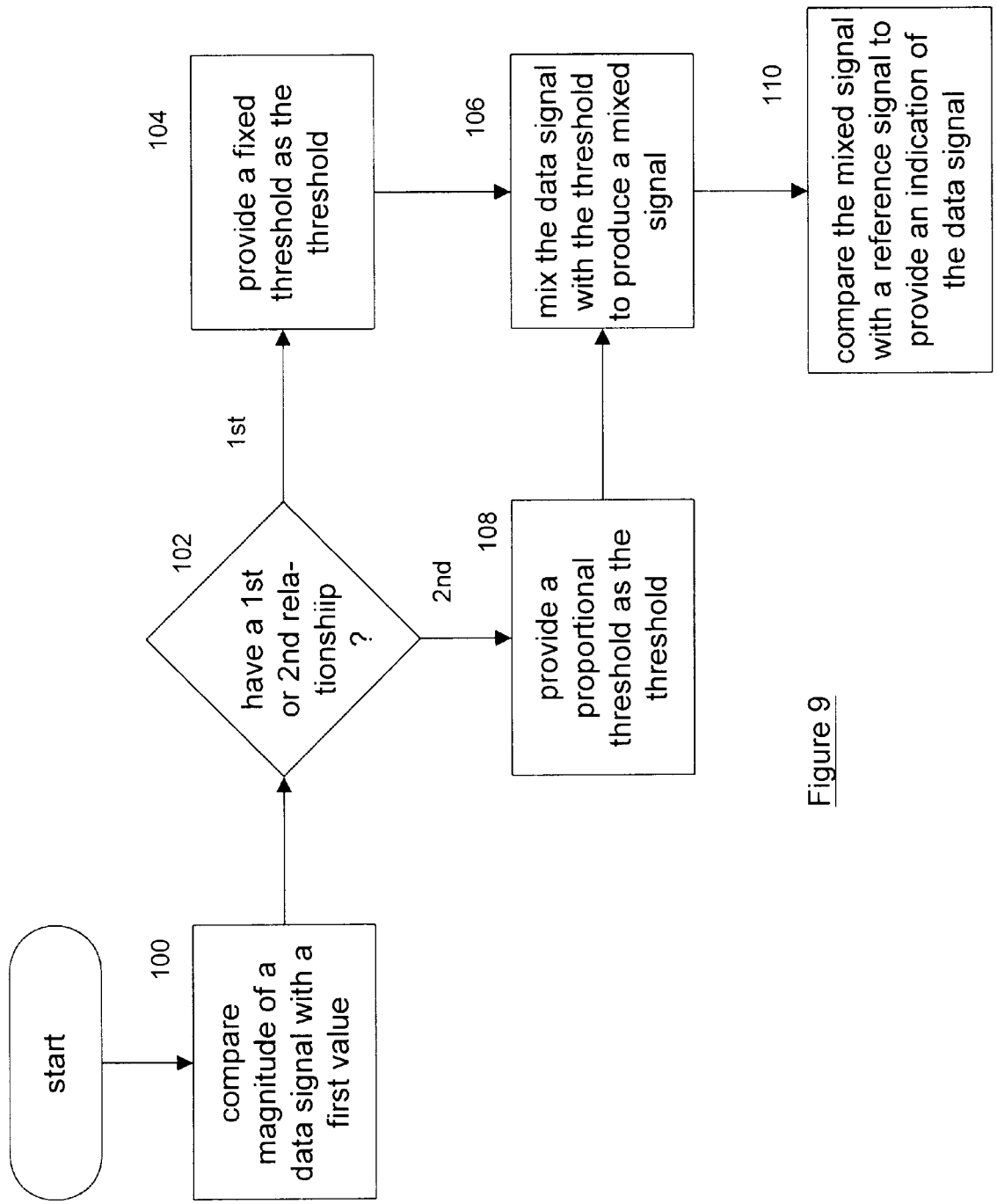
FIG. 9 illustrates a logic diagram which may be used to detect data in accordance with the present invention.

FIG. 9 illustrates a logic diagram that may be used to implement a data detection circuit. The process begins at step 100 where the magnitude of a data signal is compared with a first value. As previously mentioned, the first value may be the fixed threshold. Having made this comparison the process proceeds to step 102 where a determination is made as to whether a first or second relationship exists between the data signal and the first value. A first relationship may exist when the magnitude of the data signal is less than the first value, while the second relationship may exist when the magnitude of the data signal is greater than the first value.

When there is a first relationship between the data signal and the first value, the process proceeds to step 104 where a fixed threshold is provided as the threshold. If, however, a second relationship between the magnitude of the data signal and the first value exists, the process proceeds to step 108 where a proportional threshold is provided as the threshold. Regardless of whether the fixed threshold or proportional threshold is provided as the threshold, the process proceeds to step 106 where the data signal is mixed with the threshold to produce a mixed signal. The process then proceeds to step 110 where the mixed signal is compared with the reference signal to provide an indication of the data signal while preserving its pulse width.

The preceding discussion has presented a method and apparatus for data detection. In particular, the enhanced adaptive threshold circuit may be incorporated into a data detection circuit which detects data transmitted over a infrared transmission path or any other type of wireless transmission medium where the transmitted data signal has a wide dynamic range. By utilizing the enhanced adaptive threshold of the present invention, the pulse width of received data signals will be preserved even when they have widely varying magnitude data signals; thereby allowing the data signals to be more readily detected.

What is claimed is:

1. A data detection circuit comprising:

an adaptive threshold circuit that provides a threshold, wherein the threshold is a fixed threshold when a data signal has a having magnitude having a first relationship with a first value and the threshold is a proportional threshold when the data signal has the magnitude a second relationship with the first value, wherein the proportional threshold is proportional to the magnitude of the data signal;

mixing circuit operably coupled to mix the threshold with the data signal to produce a mixed signal; and comparator having a first input and a second input, the first input being operably coupled to receive the mixed signal, the second input is operably coupled to receive a reference signal, and wherein the comparator provides an output indicative of the data signal.

2. The data detection circuit of claim 1 further comprises, within the adaptive threshold circuit, a fixed threshold circuit that generates the fixed threshold, a threshold comparator operably coupled to compare the threshold with the magnitude of the data signal; and a proportional circuit operably coupled to provide the fixed threshold as the threshold when the magnitude of the data signal is below the first value and operably coupled to provide the proportional threshold as the threshold when the magnitude of the data signal is above the first value.

3. The data detection circuit of claim 2 further comprises the first value being approximately equal to the fixed threshold.

4. The data detection circuit of claim 2 further comprises, within the proportional circuit, a current source;

a charge storage element, wherein a first node of the charge storage element is operably coupled to the fixed threshold;

a current sink operably coupled in parallel with the charge storage element; and a switch that operably couples the current source to the charge storage element when the threshold comparator indicates that data signal compares favorably with the fixed threshold or the proportional threshold.

5. The data detection circuit of claim 4 further comprises the switch being a transistor operably coupled to the current source, wherein the transistor regulates current supplied by the current source in a range of approximately zero current to full current.

6. The data detection circuit of claim 1 further comprises, within the adaptive threshold circuit, a functional circuit having the data signal and the threshold as inputs, wherein the functional circuit provides a difference signal when the magnitude of the data signal is greater than the threshold;

a threshold generation circuit having the fixed threshold and the difference signal as inputs, wherein the output of the threshold generation circuit produces the threshold.

7. The data detection circuit of claim 6 further comprises the threshold generation circuit performs at least one of a function of: i=c dv/dt and dv=I*(d t)/c, wherein the i represents current, the c represents capacitance, the dv represents a change in voltage and the dt represents a change in time.

8. An adaptive threshold circuit comprising:

a functional circuit operably coupled to receive a data signal and a threshold as inputs, wherein the functional circuit provides a difference signal when magnitude of the data signal is greater than the threshold; and a mixer having a fixed threshold and the difference signal as inputs, wherein the output of the mixer produces the threshold, wherein the threshold is approximately equal to the fixed threshold when the magnitude of the data signal is less than the fixed threshold and the threshold is approximately equal to a proportional threshold when the magnitude of the data signal is greater than the fixed threshold, and wherein the proportional threshold is based on the difference signal.

9. The adaptive threshold circuit of claim 8 further comprises, within the mixer;

a current source;

a charge storage element, wherein a first node of the charge storage element is operably coupled to the fixed threshold;

a current sink operably coupled in parallel with the charge storage element; and a switch that operably couples the current source to the charge storage element when the difference signal is generated.

10. A data detection circuit comprising:

an adaptive threshold circuit that provides a threshold, wherein the threshold is a fixed threshold when a data signal has a magnitude having a first relationship with a first value and the threshold is a proportional threshold when the data signal has the magnitude a second relationship with the first value, wherein the proportional threshold is proportional to the magnitude of the data signal;

an amplifier having a first input, second input, and an output, wherein the first input is coupled to receive the threshold and the data signal and the second input is operably coupled to a reference node, wherein the output provides a representation of the threshold and the data signal; and a comparator that compares the representation with a reference signal, wherein the comparator provides an output indicative of the data signal when the representation compares favorably with the reference signal.

11. The data detection circuit of claim 10 further comprises, within the adaptive threshold circuit, a fixed threshold circuit that generates the fixed threshold, a threshold comparator operably coupled to compare the threshold with the magnitude of the data signal; and a proportional circuit operably coupled to provide the fixed threshold as the threshold when the magnitude of the data signal is below the first value and operably coupled to provide the proportional threshold as the threshold when the magnitude of the data signal is above the first value.

12. The data detection circuit of claim 10 further comprises, within the adaptive threshold circuit, a functional circuit having the data signal and the threshold as inputs, wherein the functional circuit provides a difference signal when the magnitude of the data signal is greater than the threshold;

a threshold generation circuit having the fixed threshold and the difference signal as inputs, wherein the output of the threshold generation circuit produces the threshold.

13. A data detection circuit comprising:

an adaptive threshold circuit that provides a threshold, wherein the threshold is a fixed threshold when a data signal has a magnitude having a first relationship with a first value and the threshold is a proportional threshold when the data signal has the magnitude a second relationship with the first value, wherein the proportional threshold is proportional to the magnitude of the data signal;

a differential amplifier having a first input, second input, a first output, and a second output, wherein the first input is coupled to receive the threshold and the data signal, wherein the second input is operably coupled to receive an inversion of the data signal and a reference signal, wherein the first and second outputs provide a representation of the threshold and the data signal; and a comparator operably coupled to receive the first and second outputs as inputs, wherein the comparator provides an output indicative of the data signal when the first and second outputs compare favorably.

14. The data detection circuit of claim 13 further comprises, within the adaptive threshold circuit, a fixed threshold circuit that generates the fixed threshold, a threshold comparator operably coupled to compare the threshold with the magnitude of the data signal; and a proportional circuit operably coupled to provide the fixed threshold as the threshold when the magnitude of the data signal is below the first value and operably coupled to provide the proportional threshold as the threshold when the magnitude of the data signal is above the first value.

15. The data detection circuit of claim 13 further comprises, within the adaptive threshold circuit, a functional circuit having the data signal and the threshold as inputs, wherein the functional circuit provides a difference signal when the magnitude of the data signal is greater than the threshold;

a threshold generation circuit having the fixed threshold and the difference signal as inputs, wherein the output of the threshold generation circuit produces the threshold.

16. A method for detecting data comprising the steps of:

a) providing a fixed threshold when a data signal has a first relationship to a first value;

b) providing a proportional threshold when the data signal has a second relationship to the first value, wherein the proportional threshold is proportional to the data signal;

c) mixing the fixed threshold or the proportional threshold with the data signal to produce a mixed signal; and d) comparing the mixed signal with a reference signal to detect presence of the data signal and preserve pulse width of the data signal.

* * * * *